United States Patent
Zhang et al.

(10) Patent No.: US 9,749,992 B2
(45) Date of Patent: Aug. 29, 2017

(54) UPLINK FEEDBACK FOR MULTI-SITE SCHEDULING

(75) Inventors: Guodong Zhang, Syosset, NY (US);
Paul Marinier, Brossard (CA);
Yingxue K. Li, Exton, PA (US);
Stephen E. Terry, Northport, NY (US);
Diana Pani, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 376 days.

(21) Appl. No.: 13/566,044

(22) Filed: Aug. 3, 2012

(65) Prior Publication Data
US 2013/0201841 A1    Aug. 8, 2013

Related U.S. Application Data

(60) Provisional application No. 61/522,214, filed on Aug. 10, 2011.

(51) Int. Cl.
*H04W 72/04*     (2009.01)
*H04L 1/16*     (2006.01)
(Continued)

(52) U.S. Cl.
CPC ........... *H04W 72/04* (2013.01); *H04L 1/1607* (2013.01); *H04L 1/1861* (2013.01);
(Continued)

(58) Field of Classification Search
CPC ..... H04L 5/0055; H04L 5/0053; H04L 5/001; H04L 1/1861
See application file for complete search history.

(56) References Cited

U.S. PATENT DOCUMENTS

| 2006/0034241 A1 | 2/2006 | Czaja et al. |
| 2009/0238144 A1 | 9/2009 | Cave et al. |

(Continued)

FOREIGN PATENT DOCUMENTS

| JP | 2011-515965 A | 5/2011 |
| KR | 20110039480 A | 4/2011 |

(Continued)

OTHER PUBLICATIONS

3rd Generation Partnership Project (3GPP), R2-052986, "HSDPA re-pointing", Philips, 3GPP TSG-RAN WG 2, Meeting #49, Seoul, Korea, Nov. 7-11, 2005, 4 pages.

(Continued)

*Primary Examiner* — Jung Park
(74) *Attorney, Agent, or Firm* — Condo Roccia Koptiw LLP

(57) ABSTRACT

Systems, methods, and instrumentalities are disclosed for a user equipment (UE) to provide feedback in a multi-site scheduling system (e.g., a system where multiple entities may schedule and/or send data to the UE). For example, the UE may receive a first data from a first network entity and a second data from a second network entity. A network entity may include entities that transmit data and/or control information to the UE, e.g., an eNodeB (eNB). The UE may generate feedback relating to received data, such as ACK/NACK information or channel state information (CSI). The UE may send a first feedback relating to the first data in a first subframe and a second feedback relating to the second data in a second subframe.

20 Claims, 7 Drawing Sheets

(51) Int. Cl.
*H04L 1/18* (2006.01)
*H04L 5/00* (2006.01)
*H04B 7/022* (2017.01)
*H04L 1/00* (2006.01)
*H04W 28/06* (2009.01)
*H04W 72/12* (2009.01)
*H04B 7/06* (2006.01)

(52) U.S. Cl.
CPC .......... *H04L 5/0055* (2013.01); *H04B 7/022* (2013.01); *H04B 7/0626* (2013.01); *H04L 2001/0092* (2013.01); *H04W 28/06* (2013.01); *H04W 72/12* (2013.01)

(56) References Cited

U.S. PATENT DOCUMENTS

| | | | |
|---|---|---|---|
| 2010/0027471 | A1 | 2/2010 | Palanki et al. |
| 2010/0118817 | A1* | 5/2010 | Damnjanovic ........ H04L 1/0026 370/329 |
| 2010/0271970 | A1 | 10/2010 | Pan et al. |
| 2010/0296472 | A1* | 11/2010 | Lee et al. .................. 370/329 |
| 2011/0317652 | A1 | 12/2011 | Kim et al. |
| 2012/0307672 | A1* | 12/2012 | Liu et al. .................. 370/252 |
| 2013/0028205 | A1* | 1/2013 | Damnjanovic et al. ...... 370/329 |
| 2013/0089159 | A1* | 4/2013 | Liu ............................... 375/267 |
| 2013/0223298 | A1* | 8/2013 | Ahn et al. ................... 370/280 |
| 2014/0119328 | A1* | 5/2014 | Kotecha ....................... 370/329 |
| 2014/0133336 | A1* | 5/2014 | Park et al. ................... 370/252 |
| 2014/0133343 | A1* | 5/2014 | Lee et al. .................... 370/252 |
| 2014/0169276 | A1* | 6/2014 | Choi et al. .................. 370/328 |
| 2014/0233498 | A1* | 8/2014 | Chen et al. .................. 370/329 |
| 2015/0304076 | A1* | 10/2015 | Lee et al. .................... 370/329 |

FOREIGN PATENT DOCUMENTS

| | | |
|---|---|---|
| WO | WO 2010/014969 A1 | 2/2010 |
| WO | WO 2010/101409 A2 | 9/2010 |
| WO | WO 2011/041623 A1 | 4/2011 |
| WO | WO 2011/085230 A2 | 7/2011 |
| WO | WO 2011/100492 A1 | 8/2011 |
| WO | WO 2011/100673 A2 | 8/2011 |

OTHER PUBLICATIONS

3$^{rd}$ Generation Partnership Project (3GPP), R1-090629, "Uplink Control Channel Design for LTE-Advanced", ZTE, 3GPP TWG RAN WG1, Meeting #56, Athens, Greece, 5 pages.

3$^{rd}$ Generation Partnership Project (3GPP), R1-094093 "Discussion on CoMP with Implicit CQI Feedback", Samsung, 3GPP TSG RAN WG1, Meeting # 58 bis, Miyazaki, Japan, Oct. 12-16, 2009, 6 pages.

3$^{rd}$ Generation Partnership Project (3GPP), R1-101172, "Further discussions of CoMP Standard Issues", Samsung, 3GPP TSG RAN WG1, Meeting # 60, San Francisco, USA, Feb. 22-26, 2010, 3 pages.

\* cited by examiner

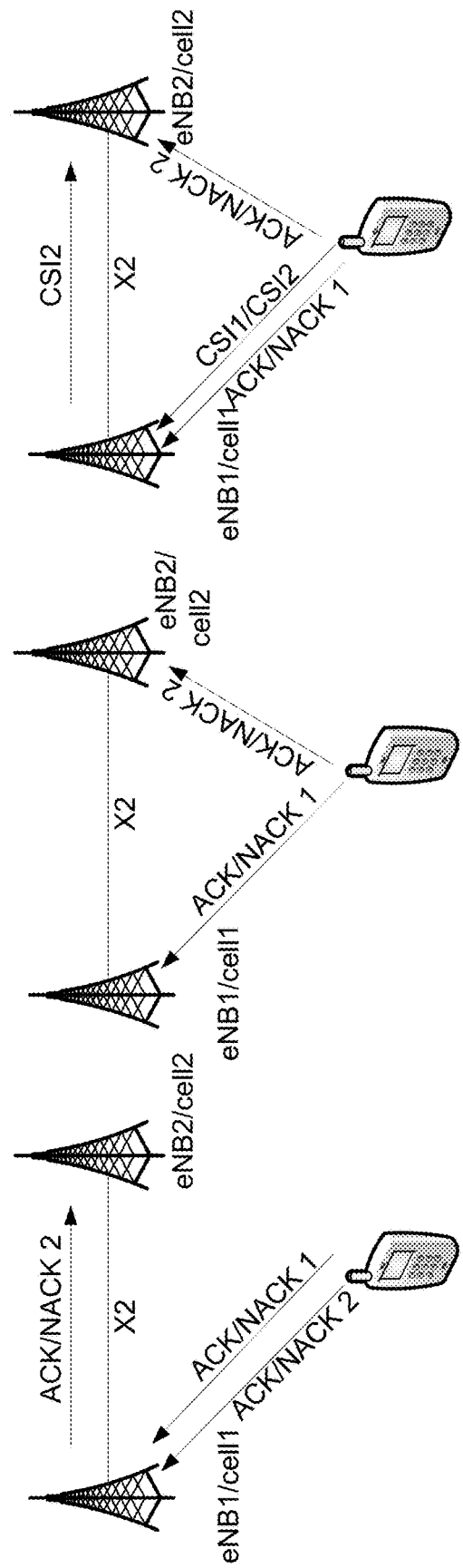

UPLINK FEEDBACK FOR MULTI-SITE SCHEDULING

CROSS REFERENCE TO RELATED APPLICATIONS

This application claims the benefit of U.S. Provisional Patent Application No. 61/522,214 filed Aug. 10, 2011, the contents of which are hereby incorporated by reference herein.

BACKGROUND

The use of mobile communication systems continues to increase at a fast pace. Mobile communications systems have undergone changes to respond to these ever increasing demands. However, today's mobile communication systems have many problems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Systems, methods, and instrumentalities are disclosed for a user equipment (UE) to provide feedback in a multi-site scheduling system (e.g., a system where multiple entities may schedule and/or send data to the UE). For example, the UE may receive a first data from a first network entity and a second data from a second network entity. The first data and second data may comprise data and/or control information. A network entity may include entities that transmit data and/or control information to the UE, e.g., an eNodeB (eNB). The UE may generate feedback relating to received data, such as ACK/NACK information, channel state information (CSI), precoding matrix indicator (PMI) information, rank indication (RI) information, etc. The UE may send a first feedback relating to the first data in a first subframe and a second feedback relating to the second data in a second subframe. The first and second subframe may each comprise one or more subframes. For example, the first subframe may comprise a first set of subframes and the second subframe may comprise a second set of subframes.

The UE may send feedback to the network entities where the feedback may be segregated in the time domain and sent via one or more channels. For example, as described above, the first feedback may be sent in a first subframe and the second feedback may be sent in a second subframe. The subframe segregation (e.g., subframe splits) may be implemented via scheduling, assignment, etc. Still referring to the above example, the first feedback and the second feedback may be sent so that the first subframe may be an even subframe and the second subframe may be an odd subframe, or vice versa. The UE may send feedback (e.g., the first and/or second feedback) on one or more of a Physical Uplink Shared Channel (PUSCH) or a Physical Uplink Control Channel (PUCCH). Feedback may be sent on the PUCCH and not on the PUSCH, e.g., if a PUSCH transmission is not scheduled.

BRIEF DESCRIPTION OF THE DRAWINGS

A more detailed understanding may be had from the following description, given by way of example in conjunction with the accompanying drawings wherein:

FIGS. 3A-3C illustrate exemplary multi-site scheduling systems and related messaging.

DETAILED DESCRIPTION

Figure 1A:
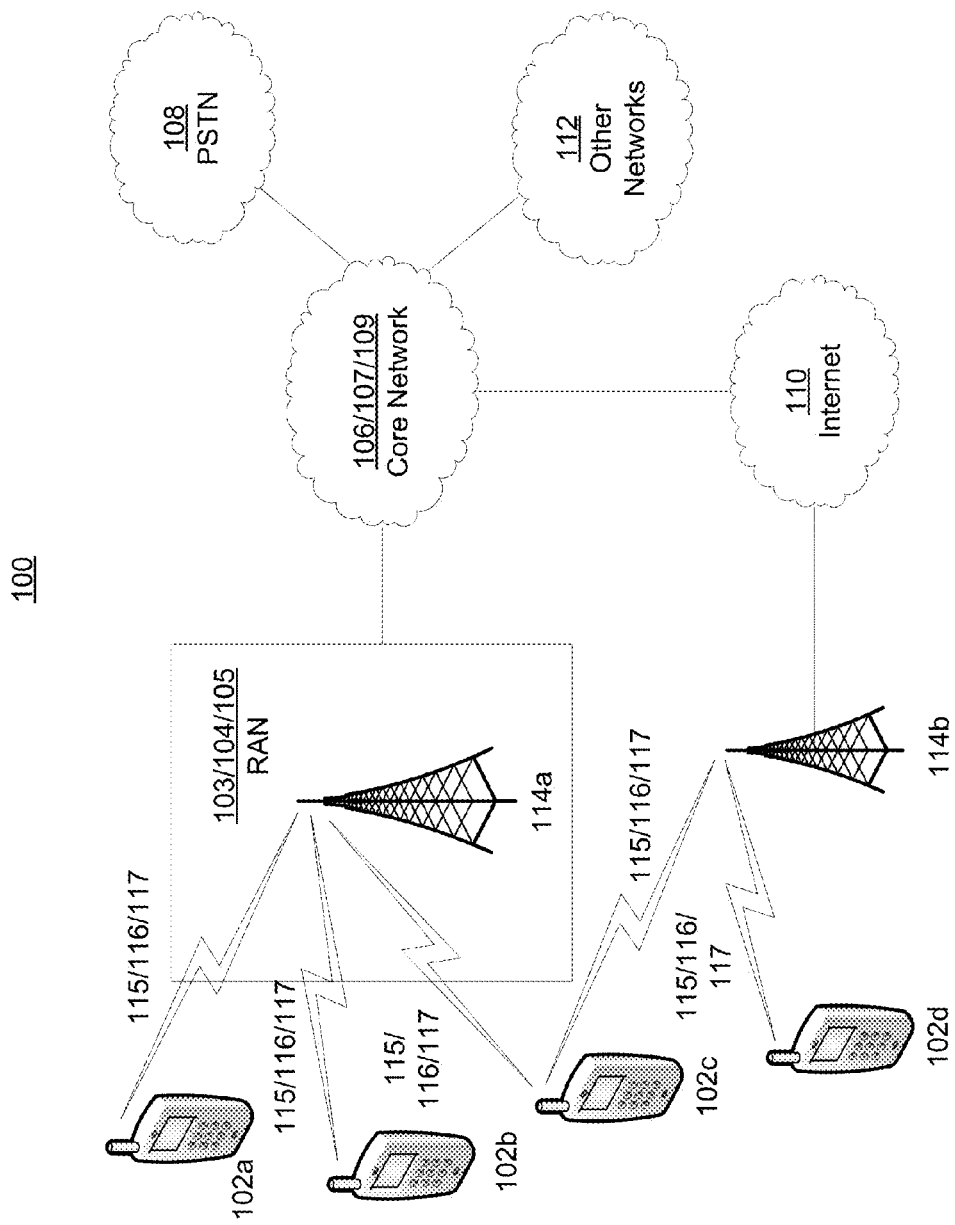
FIG. 1A is a system diagram of an example communications system in which one or more disclosed embodiments may be implemented.

A detailed description of illustrative embodiments may now be described, e.g., with reference to the figures. However, while the present invention may be described in connection with exemplary embodiments, it is not limited thereto and it is to be understood that other embodiments may be used or modifications and additions may be made to the described embodiments for performing the same function of the present invention without deviating therefrom. Disclosures herein may refer to sending or receiving a PUCCH, PUSCH, etc. This may refer to sending a PUCCH transmission (e.g., signal, message, etc.) or receiving a PUCCH transmission (e.g., signal, message, etc.), etc. Disclosures herein may refer to a UE sending a transmission to an eNB. This may refer to a UE using specific transmission characteristics such as transmission power, timing, scrambling sequence for reference signal, cell identity, etc. The UE may not know about an eNB to which it is sending transmissions. The set of transmission characteristics may match characteristics of a signal to be received by a certain eNB.

In LTE Rel-10, the ACK/NACK PUCCH resource index may be determined by the downlink assignment. HARQ-ACK transmission on two antenna ports ($p \in [p_0, p_1]$) may be supported for PUCCH format 1a/1b as follows. For FDD and one configured serving cell, the UE may use PUCCH resource $n_{PUCCH}^{(1,p)}$ for transmission of HARQ-ACK in subframe n on antenna port p for PUCCH format 1a/1b, where one or more of the following may apply.

For a PDSCH transmission indicated by the detection of a corresponding PDCCH in subframe n−4, or for a PDCCH indicating downlink SPS release in subframe n−4, the UE may use $n_{PUCCH}^{(1,p=p_0)} = n_{CCE} + N_{PUCCH}^{(1)}$ for antenna port $p = p_0$, where $n_{CCE}$ is the number of the first CCE (e.g., lowest CCE index used to construct the PDCCH) used for transmission of the corresponding DCI assignment and $N_{PUCCH}^{(1)}$ is configured by higher layers. For two antenna port transmission, the PUCCH resource for antenna port $p = p_1$ may be given by $n_{PUCCH}^{(1,p=p_1)} = n_{CCE} + 1 + N_{PUCCH}^{(1)}$.

For a PDSCH transmission on the primary cell where there is not a corresponding PDCCH detected in subframe n−4, the value of $n_{PUCCH}^{(1,p)}$ may be determined according to a higher layer configuration and/or Table 1. For a UE configured for two antenna port transmission, a PUCCH resource value in Table 1 may map to two PUCCH resources with the first PUCCH resource $n_{PUCCH}^{(1,\tilde{p}=p_0)}$ for antenna port $p_0$ and the second PUCCH resource $n_{PUCCH}^{(1,\tilde{p}=p_1)}$ for antenna port $p_1$, otherwise, the PUCCH resource value may map to a single PUCCH resource $n_{PUCCH}^{(1,\tilde{p}=p_0)}$ for antenna port $p_0$.

TABLE 1

PUCCH Resource value for Downlink Semi-Persistent Scheduling

| Value of 'TPC command for PUCCH' | $n_{PUCCH}^{(1,\tilde{p})}$ |
|---|---|
| '00' | The first PUCCH resource value configured by the higher layers |
| '01' | The second PUCCH resource value configured by the higher layers |
| '10' | The third PUCCH resource value configured by the higher layers |
| '11' | The fourth PUCCH resource value configured by the higher layers |

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, etc.) to establish a picocell or femtocell. As shown in FIG. 1A, the base station 114*b* may have a direct connection to the Internet 110. Thus, the base station 114*b* may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102*a*, 102*b*, 102*c*, 102*d*. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102*a*, 102*b*, 102*c*, 102*d* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102*a*, 102*b*, 102*c*, 102*d* in the communications system 100 may include multi-mode capabilities, i.e., the WTRUs 102*a*, 102*b*, 102*c*, 102*d* may include multiple transceivers for communicating with different wireless networks over different wireless links. For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
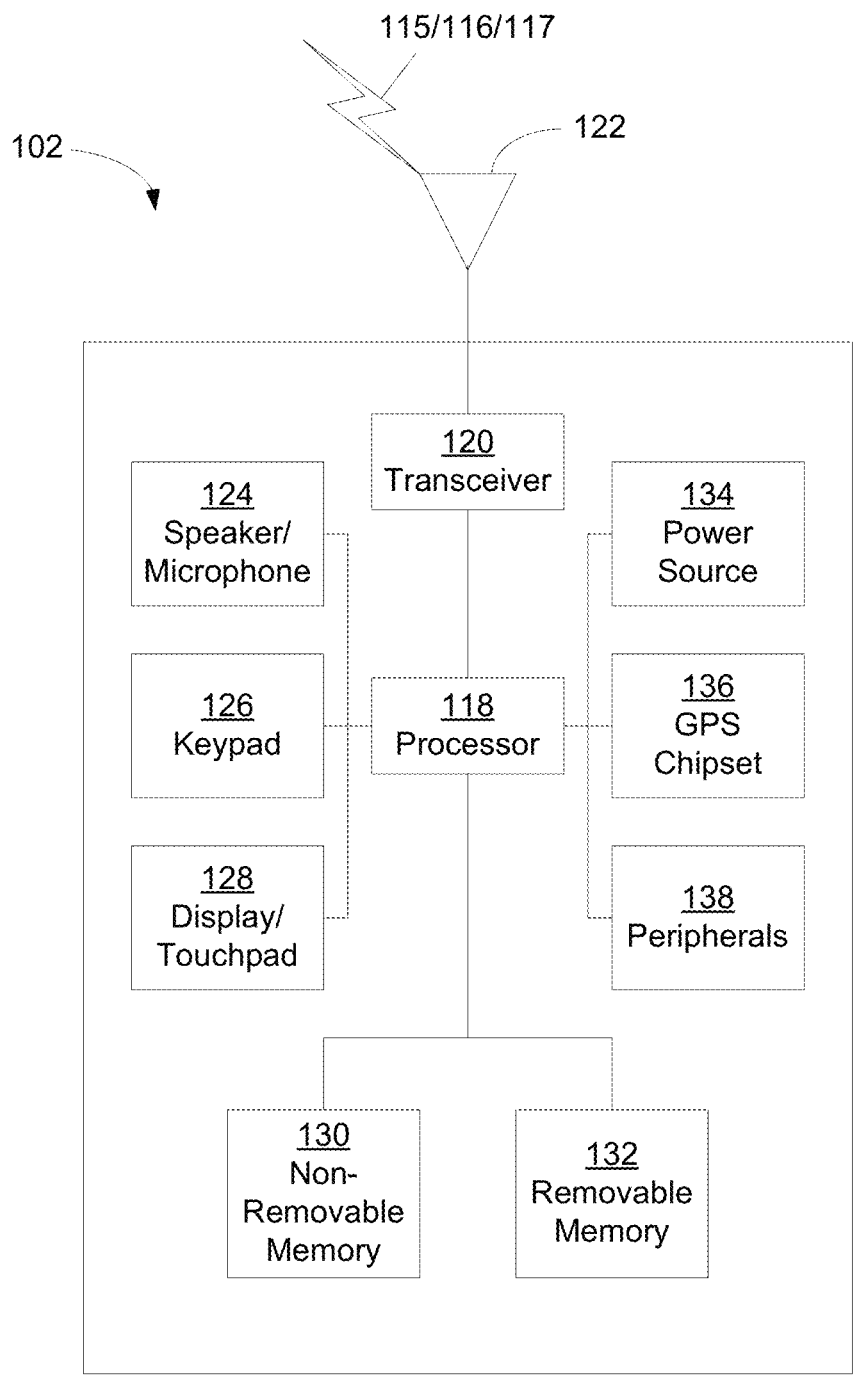
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114*a* and 114*b*, and/or the nodes that base stations 114*a* and 114*b* may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
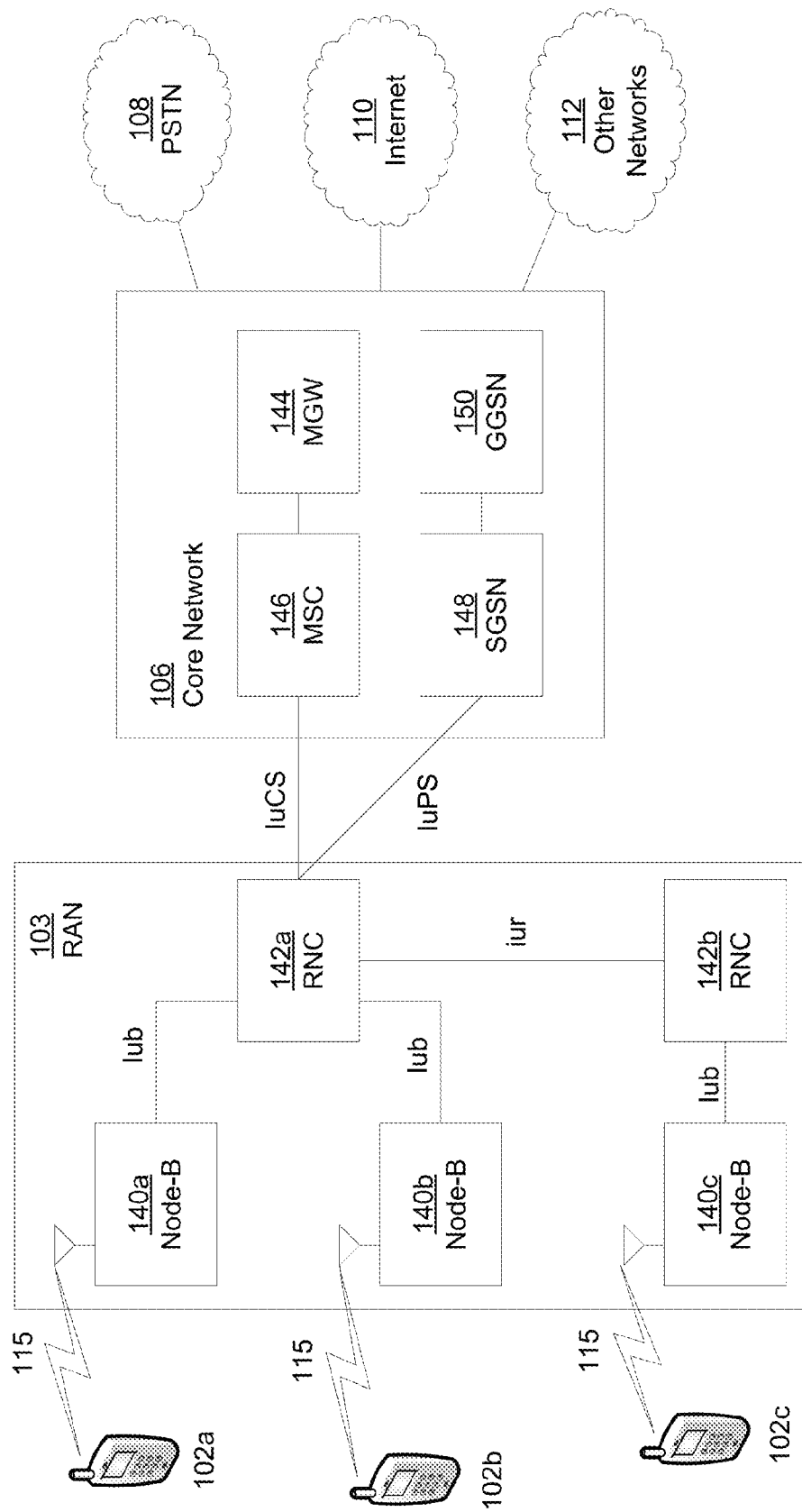
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
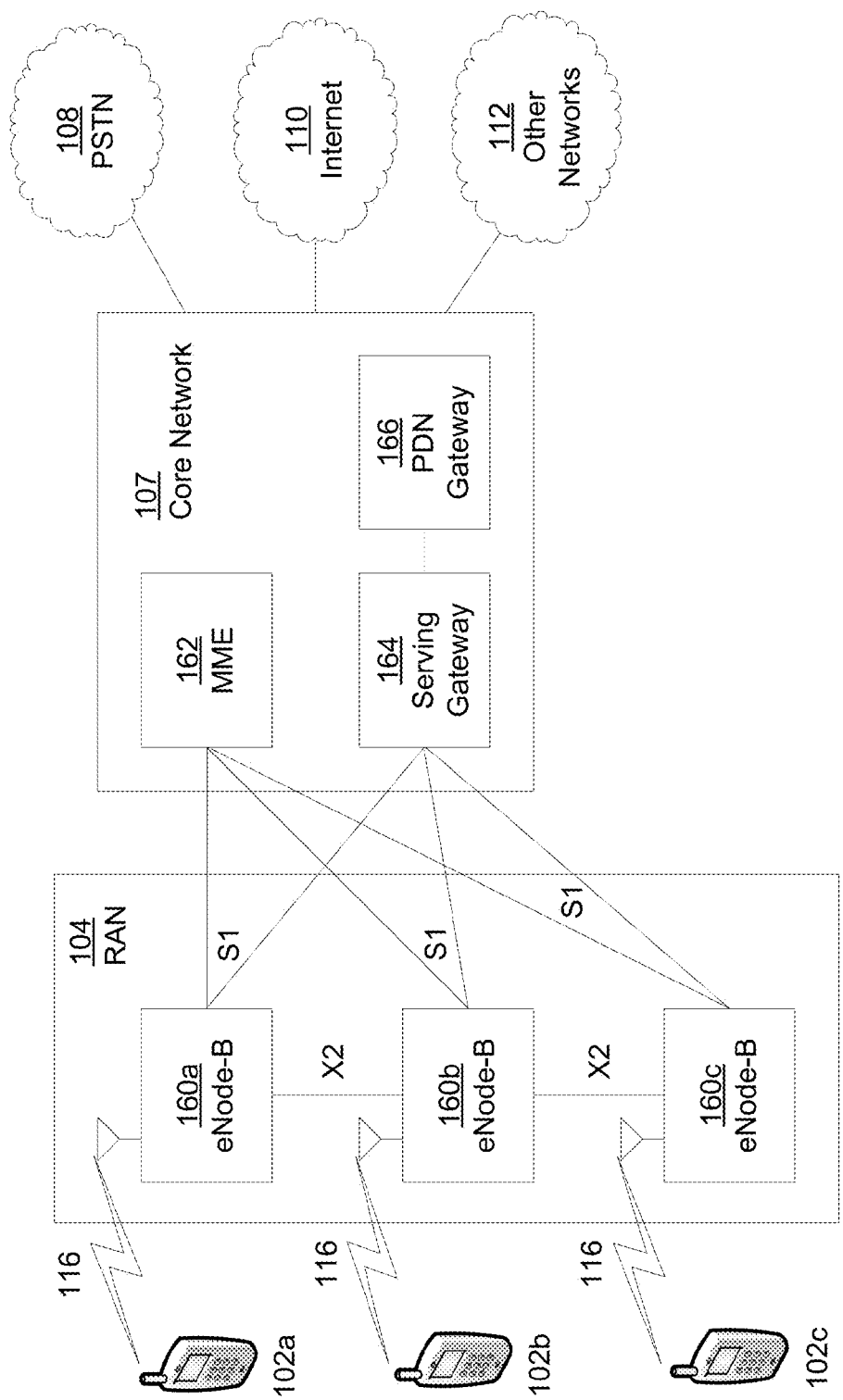
FIG. 1D is a system diagram of an another example radio access network and another example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
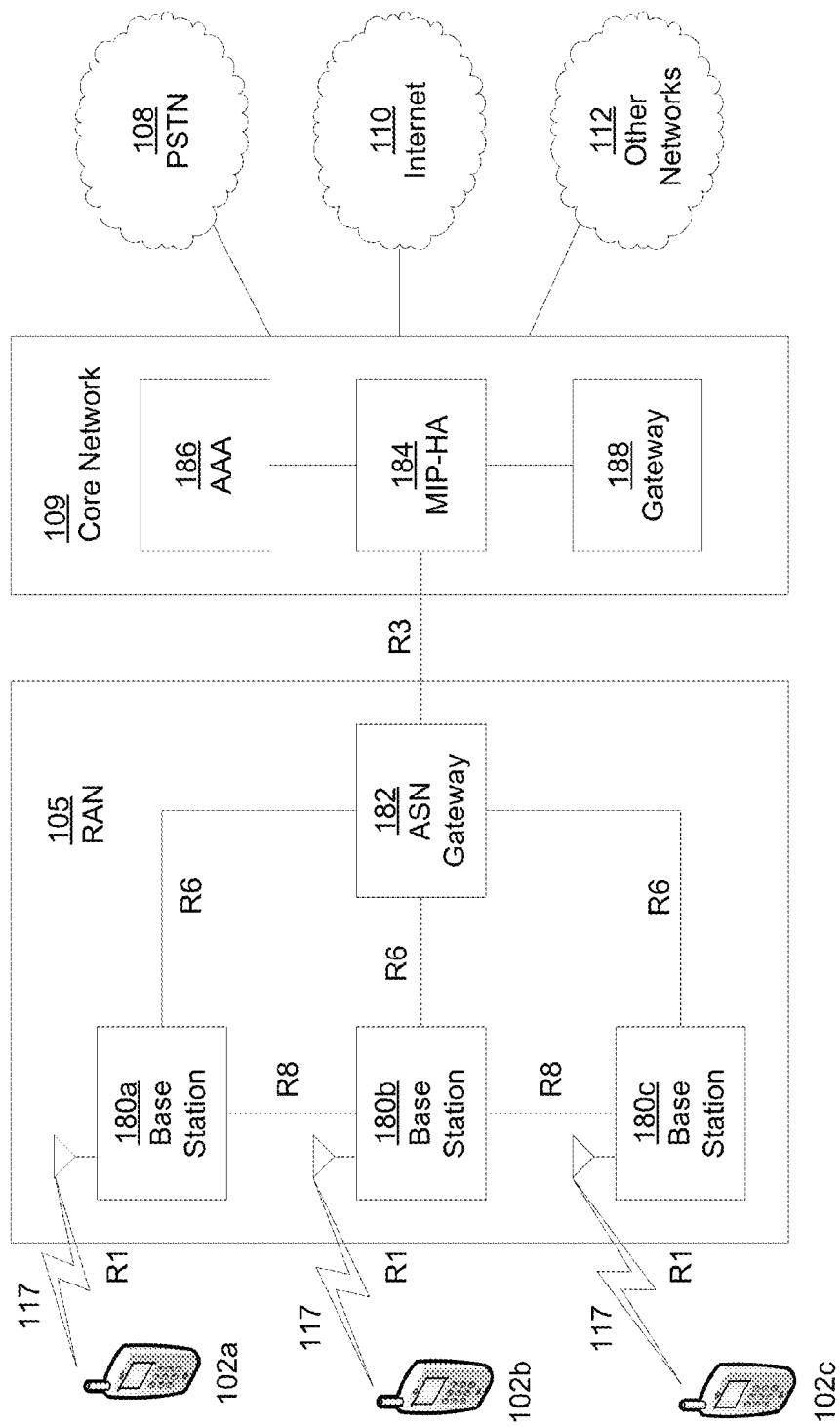
FIG. 1E is a system diagram of an another example radio access network and another example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The subject matter disclosed herein may be implemented in conjunction with various multi-site scheduling systems (e.g., a system where multiple entities may schedule and/or send data to a UE). Examples of multi-site scheduling systems may include inter-site coordinated multi-point (CoMP) systems, fuzzy cell systems, small cell deployment systems, dense cell deployment systems, any network architecture that may require more than one independent radio resource scheduler, etc. Although implementations may be illustrated with reference to a particular multi-site scheduling system, the subject matter disclosed herein may be implemented in other multi-site scheduling systems, including, but not limited to, those disclosed herein.

A UE may provide feedback to one or more network entities that schedule and/or send data to the UE. The UE may send such feedback over one or more uplink channels, such as a Physical Uplink Control Channel (PUCCH) and/or a Physical Uplink Shared Channel (PUSCH). Examples of a UE providing feedback in a multi-site scheduling system include, but are not limited to, the following, where a UE may receive a transmission from each of a primary eNB (e.g., associated with a first cell) and a secondary eNB (e.g., associated with a second cell). A UE may send a single PUCCH transmission that may be received by a first eNB (e.g., a primary eNB) and may not be received by a second eNB (e.g., a secondary eNB). A UE may send a single PUCCH and/or PUSCH transmission that may be received by the first eNB and the second eNB. A UE may send a first PUCCH transmission that may be received by the first eNB, but not the second eNB, and a second PUCCH transmission that may be received by the second eNB, but not the first eNB. In such a case, the respective PUCCH messages may be, for example, carried in different frequencies on the same component carrier, assigned different PUCCH resources, staggered in the time domain, etc.

Figure 2:
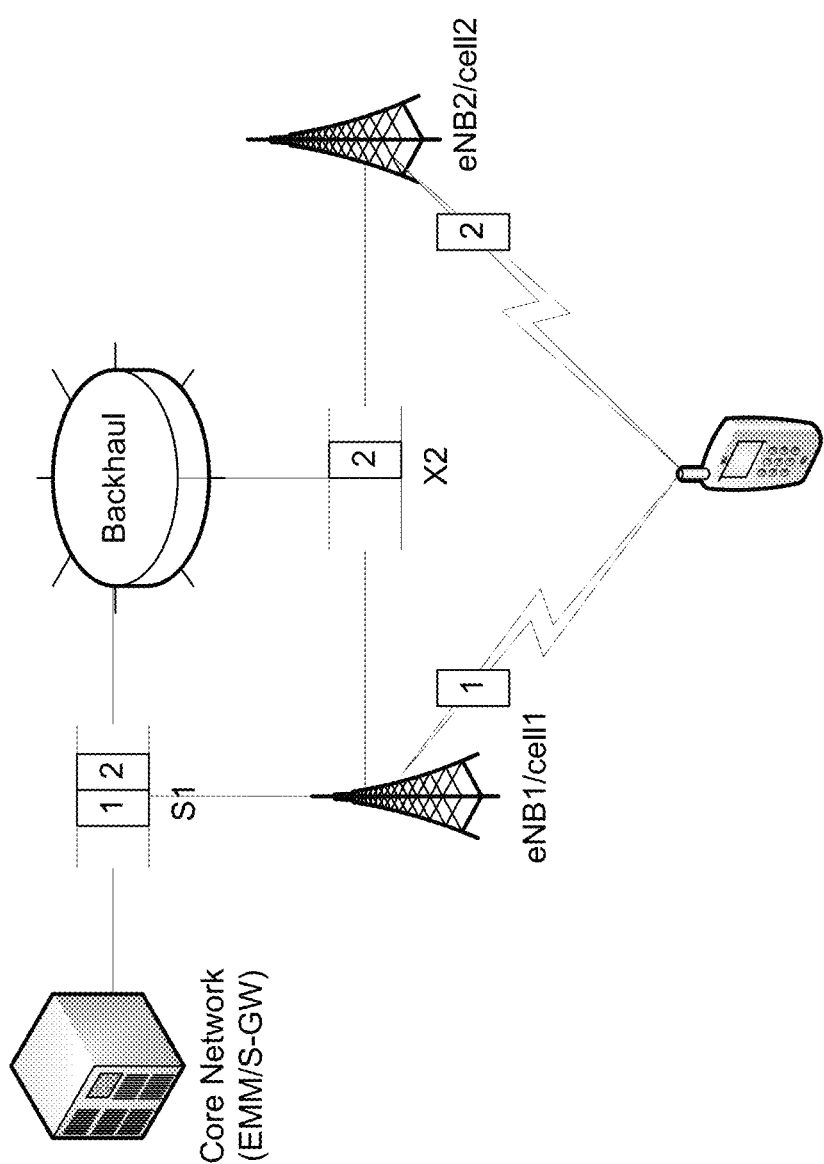
FIG. 2 illustrates an exemplary multi-site scheduling system and related messaging.

FIG. 2 illustrates an exemplary multi-site scheduling system, which may be implemented as—site coordinated multi-point (CoMP) systems, fuzzy cell systems, small cell deployment systems, dense cell deployment systems, or any network architecture requiring more than one independent radio resource scheduler.

A fuzzy cell may mitigate cell coverage problems near cell-edges, improve handover performance, and improve overall system performance. The architecture may use multiple flows from multiple sites, e.g., to increase transmission signal quality and data throughput. Information (e.g., data) being sent to the UE may be split into sub-flows. As an example, a process to split a data flow into sub-flows for transmissions using multiple sites is described in PCT Patent Application PCT/US2011/24438, entitled "Split Data Flows Between Multiple Transmission Sites," filed Feb. 11, 2011, which is incorporated herein by reference.

FIG. 2 illustrates splitting downlink and/or uplink data flows. In the example of FIG. 2 the downlink flow split may occur via the eNB (e.g., primary eNB, which may be referred to as a serving eNB), however, data splitting may be performed by other network entities. An application data packet may be downloaded from the core network (CN) to the primary eNB (eNB1), e.g., via an S1 interface. The primary eNB may split the data that it receives. The data may be split into two parts (e.g., Parts '1' and '2'). Part 1 may be sent to the UE from the primary eNB (eNB1). Part 2 may be forwarded to a secondary eNB (eNB2), e.g., via an X2 or X2 like interface between eNB's, and sent to the UE by eNB2. Data may be split depending on quality of service, traffic load requirements, and/or resource availability at a specific eNB. Data may be split by radio bearer where certain radio bearers are routed to a specific eNB. One method of splitting radio bearers may be to route Signaling Radio Bearers (SRBs) to one eNB and Data Radio Bearers to other eNB(s). Another method would be to route data based on indications of resource availability form each eNB A secondary eNB may be referred to as a cooperating eNB. In a case of N secondary eNBs, the data may be split into N parts by the primary eNB and delivered to appropriate secondary eNBs for transmission to the UE.

Additional signaling over a backhaul may be provided, e.g., to support efficient data splitting control of the data flow rate between eNBs. In an example relating to FIG. 2, eNB2 may provide estimates of the supported data rate it is capable of providing to UEs that it shares with eNB1. Such estimates may allow eNB1 to make an initial decision about how much data and/or what data to send to eNB2 for data buffered at eNB1. eNB2 may continue to inform eNB1 of estimated supported data rates and may send buffer status reports back to eNB1, which may provide eNB1 with more accurate information about the actual delivery rate of the forwarded data. Based on the updated information, eNB1 may decide whether or not to send more data to eNB2. In this manner, eNB1 may maintain data flow control and/or balance between the data flows. The concept of FIG. 2 may be implemented in other multi-site scheduling systems.

UL data splitting in the UE may be managed in a similar manner as DL data splitting (e.g., FIG. 2). Data may be split depending on quality of service, traffic load requirements, and/or resource availability at a specific eNB. Data may be split by radio bearer where certain radio bearers are routed to a specific eNB. Depending on availability of UL resource grants received by a particular eNB, the UE may select data to transmit based on these criterias. As in the DL case, selected data may be based on resource availability and/or the radio bearer this data with which this data is associated. These criteria may be added to the existing UE Logical Channgfe Prioritization function, e.g., to achieve the desired data splitting.

The subject matter disclosed herein may be implemented with or without the network entities coordinating the splitting and/or scheduling of data flows. For example, distributed scheduling may be utilized, e.g., where eNBs may not coordinate the scheduling with each other in the DL and/or the UL, which may result in individual PDCCHs transmitted from each eNB/cell. Coordinated scheduling may be utilized. In an example, eNBs may coordinate scheduling with each other, e.g., to minimize mutual interference, but a UE may receive data from a single eNB.

In LTE (e.g., Rel-10), an ACK/NACK PUCCH resource index may be determined by downlink assignment. HARQ-ACK transmission on two antenna ports may be supported for PUCCH format 1a/1b.

FIG. 3A illustrates exemplary multi-site scheduling and associated signaling. In the example of FIG. 3A, the multi-site scheduling system may include a UE sending a single PUCCH transmission that may be received by eNB1 (e.g., a primary eNB) and may not be received by a eNB2 (e.g., a secondary eNB). Such implementations may provide HARQ timing that accommodates a delay associated with a first eNB/cell forwarding the ACK/NACK corresponding to the PDSCH scheduled by a second eNB/cell to a second eNB/cell, e.g., over the X2 or X2 like interface. An eNB/cell may refer to an eNB associated with a cell, e.g., a first eNB associated with a first cell, a second eNB associated with a second cell, etc.

A single PUCCH may be transmitted on and received by a first eNB/cell, but not a second eNB/cell, or, a single PUCCH may be transmitted on and received by the first and second eNBs/cells. Such implementations may provide proper transmission and reception of ACK/NACK feedback for a second eNB/cell because a first eNB/cell may not be aware of an PDSCH scheduled by the second eNB/cell and the ACK/NACK PUCCH resource may be implicitly mapped to the downlink scheduling grant of the associated PDSCH.

A separate PUCCH for each cell may be transmitted in different sub-frames. This may provide a proper PUCCH transmission and reception because each cell may not know the ACK/NACK PUCCH resources determined by the other cell.

In the example of FIG. 3A, the number of a second eNB/cell HARQ process may be increased, e.g., to cope with an extra X2 delay that may be needed to forward ACK/NACK from a first eNB/cell to a second eNB/cell. The increased number of the HARQ process may increase the latency of data reception from a second eNB/cell and may require a larger buffer size at the UE for HARQ combining. Using an inter-site multicarrier CoMP system as an example, the maximum X2 delay may be referred to herein as $N_{max}$ TTIs (e.g., where a TTI may be a two slot subframe, or 1 millisecond, etc.), and, the average X2 delay is $N_{ave}$ TTIs. The HARQ and associated ACK/NACK feedback timing may be maintained, e.g., via one or more of the following exemplary implementations. The number of DL HARQ processes in a second eNB/cell, denoted by $N_s$, may be $8+N_{max}$. The number of DL HARQ processes configured by a second eNB/cell, denoted by $N_s$, may be configured to be $8+N_{ave}$+margin. For example, an X2 interface with a maximum delay of 20 ms and average delay of 10 ms may be provisioned with 28 DL HARQ processes configured for a UE in a second eNB/cell using the former approach, or with 18 plus a margin for a total of 20 or 22 DL HARQ processes for example. The HARQ entity in the UE MAC may be configured for the appropriate number of HARQ processes.

With an increased number of DL HARQ processes, the bitfield size of HARQ process ID in the Downlink Control Information (DCI) format for associated DL assignment may be increased from 3 bits to $\log_2(N_s)$ bits, where Ns is the number of HARQ processes. The UE may blindly detect the PDCCH format k, where k is an index to the various formats, with a length of M bits in its UE specific and cell common search spaces (e.g., within a predetermined set of CCEs) in a primary cell/eNB. For a UE operating in inter-site multicarrier CoMP mode, in the second cell/eNB, the UE may be configured to blindly detect the PDCCH format k with a length of $M+\log_2(N_s)-3$ bits in its UE specific and cell common search spaces.

UL feedback on PUCCH and/or PUSCH may be directed to two eNBs (e.g., each eNB may be associated with a different cell). The feedback may be associated with PDSCH assignments from a particular eNB or a particular MAC instance or transport channel, e.g., each eNB may correspond to a MAC instance. The UE may send feedback on the uplink in different subsets of subframes, or subframe splits. For example, the UE may be configured to transmit one or more of the PUCCH, PUSCH, and other uplink channels pertaining to cells belonging to different eNBs, or as described herein different MAC instances, in different subsets of subframes, or subframe splits. FIG. 3B illustrates exemplary multi-site scheduling, where feedback may be sent in different subframes (e.g., which may be different sets of subframes). The subsets may be preconfigured, e.g., by default, through RRC signaling, RRC reconfiguration messages, etc. Such uplink transmissions pertaining to a cell and associated eNB may include feedback to PDSCH assignments received from the cell/eNB, a PUSCH transmitted as a result of a grant received for the cell, SRS transmissions controlled by the cell, a scheduling request (SR) applicable to a cell or a corresponding MAC instance, etc. An exemplary subframe split configuration may comprise having uplink transmissions pertaining to cells of a first eNB in even subframes and uplink transmissions pertaining to cells of a second eNB in odd subframes. The subset of subframes where transmissions pertaining to cells of a specific eNB are carried out may be referred to as an "eNB subframe subset." Segregating uplink transmissions pertaining to different eNBs in the time domain may enable independent control from each eNB and may avoid a possibility that the UE may have to exceed its maximum transmission power due to absence of coordination between the eNBs.

PUCCH transmissions may be sent by a UE to provide feedback. A PUCCH carrying HARQ feedback and/or CSI feedback pertaining to cells of a specific eNB may be transmitted in a subframe belonging to the eNB subframe subset, e.g., when no PUSCH transmission is scheduled in the subframe, or when use of PUCCH and PUSCH is configured.

The payload of the PUCCH transmission may include HARQ feedback bits for PDSCH transmissions of multiple cells of the eNB, e.g., received in at least one subframe according to a pre-determined order and timing relationship. The timing relationship may be such that for a PDSCH transmission in a cell of the eNB there may be one subframe where the corresponding HARQ feedback can be transmitted. For example, the HARQ feedback bits transmitted in subframe n may comprise 8 bits, where 4 bits correspond to HARQ feedback for PDSCH transmissions of 2 cells controlled by the eNB received in subframe n−k, and 4 bits correspond to HARQ for PDSCH transmissions of the 2 cells controlled by the eNB received in subframe n−k+1.

The format and resource index of the PUCCH transmission carrying HARQ feedback for at least one PDSCH transmission in a given subframe may be determined from at least one property of at least one PDSCH transmission or its corresponding PDCCH assignment. Examples of such properties include: a field in the PDCCH assignment, such as a downlink assignment index or A/N resource indicator (e.g., TPC bits); a downlink assignment index (DAI) field; starting control channel element of a PDCCH assignment; the cell in which the PDSCH transmission is received; the cell in which the PDCCH transmission is received; or, the subframe in which the PDSCH or PDCCH transmission is received.

One or more of the following may be implemented. In case a single PDSCH transmission in a first cell is received in subframe n−k and no PDSCH transmission is received in subframe n−k+1, PUCCH format 1b may be selected and the resource determined from the starting control channel element of the PDCCH comprising the assignment or the resource configured by higher layers, e.g., in case there is no PDCCH. In other cases, PUCCH format 3 and a resource indicated by the TPC field and/or a DAI field of a PDCCH transmission received in subframe n−k or n−k+1 may be selected, where a PDCCH transmission corresponding to the PDSCH transmission of a specific cell in subframe n−k may be excluded from the selection.

PUSCH transmissions may be sent by a UE to provide feedback. In an example, a UE may monitor the grants for PUSCH transmissions on cells of a specific eNB limited to a subset of subframes. This subset of subframes may comprise the subframes for which reception of a grant would result in a PUSCH transmission in a later subframe belonging to the "eNB subframe subset" of this eNB. The PUSCH transmission may carry HARQ feedback bits for PDSCH transmissions according to the same timing relationship as for the case of a PUCCH transmission described herein.

Grouping of ACK/NACK information (e.g., bits) may be disclosed. Such grouping may separate UL feedback for DL assignments to the eNB providing those assignments. The ACK/NACK feedback for each cell's PDSCH may be transmitted on PUCCHs in different (e.g., non-overlapping)

TTIs. This may relate to the case where a first eNB/cell and a second eNB/cell may schedule PDSCH in a TTI. For the first eNB/cell, the ACK/NACK of PDSCHs in each $N_p$ TTIs may be grouped and transmitted on PUCCHs in $K_p$ TTIs to the eNB. For the second eNB/cell, the ACK/NACK of PDSCHs in each $N_s$ TTIs may be grouped and transmitted on PUCCHs in $K_s$ TTIs to the eNB. The $K_p$ and $K_s$ uplink TTIs may be different (e.g., non-overlapping).

As an example of the above, $N_p=N_s=2$ and $K_p=K_s=1$, which means ACK/NACK feedback of every two TTI's PDSCHs from a first eNB/cell is grouped and transmitted on PUCCH in one TTI and ACK/NACK feedback of every two TTI's PDSCHs from a second eNB/cell is grouped and transmitted on PUCCH in the other non-overlapping TTI.

PUCCH design may be provided, e.g., to support uplink feedback on a single PUCCH. A group of PUCCH format m (e.g., format m may be 1/1a/1b or other formats) resources may be reserved for transmission of ACK/NACK feedback for a corresponding PDSCH scheduled by a second eNB/cell, and, another group of PUCCH format k resources that has sufficient payload to transmit ACK/NACK feedbacks of a first eNB/cell and a second eNB/cell may be reserved for joint transmission of ACK/NACK feedback or the transmission of ACK/NACK feedback of a first eNB/cell alone. The above may separate UL feedback for DL assignments to the eNB providing those assignments (e.g., for situations where one cell is unaware of scheduling in another cell). An example of a PUCCH format k may be PUCCH format 2/2a/2b, 3, or a PUCCH format that may be created. These reserved resources may be configured to not overlap with each other, e.g., in order to avoid collision. ACK/NACK PUCCH resource index in subframe n and corresponding PDCCH indicating PDSCH assignment in subframe n−4 or higher layer configuration (e.g., if PDSCH is semi-persistently scheduled) may be configured for a first eNB/cell and a second eNB/cell, respectively.

The following is an example of the above. HARQ-ACK transmission on two antenna ports ($p \in [p_0, p_1]$) may be supported for PUCCH. The UE may use PUCCH resource $n_{PUCCH}^{(1st,k,p)}$ or $n_{PUCCH}^{(2nd,1,p)}$ for transmission of HARQ-ACK in subframe n on antenna port p, where a PDSCH transmission indicated by the detection of a corresponding PDCCH in subframe n−4, or for a PDCCH indicating downlink SPS release in subframe n−4, the UE may use $n_{PUCCH}^{(2nd,1,p=p_0)} = n_{CCE}^{2nd} + N_{PUCCH}^{(1)}$ for antenna port $p=p_0$ if such a PDCCH is received from a second eNB/cell and use $n_{PUCCH}^{(1st,k,p=p_0)} = n_{CCE}^{1st} + N_{PUCCH}^{(k)}$ for antenna port $p=p_0$ if such a PDCCH is received from a first eNB/cell or the first and second eNBs/cells, where $n_{CCE}^{1st}$ and $n_{CCE}^{2nd}$ are the number of the first CCE (e.g., lowest CCE index used to construct the PDCCH) used for transmission of the corresponding DCI assignment in a first and second eNB/cell respectively and $N_{PUCCH}^{(1)}$ and $N_{PUCCH}^{(k)}$ are configured by higher layers. For two antenna port transmission, the PUCCH resource for antenna port $p=p_1$ may be given by $n_{PUCCH}^{(2nd,1,p=p_0)} = n_{CCE}^{2nd} + 1 + N_{PUCCH}^{(1)}$ or $n_{PUCCH}^{(1st,k,p=p_0)} = n_{CCE}^{1st} + 1 + N_{PUCCH}^{(k)}$.

For a PDSCH transmission where there is not a corresponding PDCCH detected in subframe n−4, the value of $n_{PUCCH}^{(1st,k,p)}$ or $n_{PUCCH}^{(2nd,1,p)}$ may be determined according to higher layer configuration and/or one or more of Table 2 or Table 3. For a UE configured for two antenna port transmission, a PUCCH resource value in Table 2 or Table 3 may map to two PUCCH resources with the first PUCCH resource $n_{PUCCH}^{(1,p=p_0)}$ for antenna port $p_0$ and the second PUCCH resource $n_{PUCCH}^{(1,p=p_0)}$ for antenna port $p_1$, otherwise, the PUCCH resource value may map to a single PUCCH resource $n_{PUCCH}^{(1,p=p_0)}$ for antenna port $p_0$.

TABLE 2

PUCCH Resource value for Downlink
Semi-Persistent Scheduling in a first eNB/cell or both eNBs/cells

| Value of 'TPC command for PUCCH' | $n_{PUCCH}^{(1st,k,p)}$ |
|---|---|
| '00' | The first PUCCH resource value configured by the higher layers |
| '01' | The second PUCCH resource value configured by the higher layers |
| '10' | The third PUCCH resource value configured by the higher layers |
| '11' | The fourth PUCCH resource value configured by the higher layers |

TABLE 3

PUCCH Resource value for Downlink
Semi-Persistent Scheduling in a second eNB/cell

| Value of 'TPC command for PUCCH' | $n_{PUCCH}^{(2nd,1,p)}$ |
|---|---|
| '00' | The first PUCCH resource value configured by the higher layers |
| '01' | The second PUCCH resource value configured by the higher layers |
| '10' | The third PUCCH resource value configured by the higher layers |
| '11' | The fourth PUCCH resource value configured by the higher layers |

One or more of the following may relate to UE feedback actions. If the UE receives a PDSCH assignment from a first eNB/cell in subframe n−4 and not a second eNB/cell, then the index of the PUCCH resource used to transmit ACK/NACK feedback in subframe n may be determined according to the ACK/NACK mapping rule configured for a first eNB/cell. If the UE receives the PDSCH assignment from the second eNB/cell in subframe n−4 and not the first eNB/cell, then the index of the PUCCH resource used to transmit ACK/NACK feedback in subframe n may be determined according to the ACK/NACK mapping rule configured for a second eNB/cell. If the UE receives PDSCH assignments from a first eNB/cell and a second eNB/cell in subframe n−4, then the index of the PUCCH resource used to transmit ACK/NACK feedback in subframe n may be determined according to the ACK/NACK mapping rule configured for a first eNB/cell. The UE may transmit ACK/NACK for a corresponding PDSCH scheduled by a first eNB/cell and a second eNB/cell within the same PUCCH resource.

One or more of the following may relate to eNB actions. In each sub-frame n, if a first eNB/cell scheduled a PDSCH in sub-frame n−4, the first eNB/cell may perform decoding of ACK/NACK PUCCH at the PUCCH resources index mapped to corresponding PDSCH assignment PDCCH (e.g., such decoding may be limited to the PUCCH resources index mapped to corresponding PDSCH assignment PDCCH). The first eNB/cell may need to blindly detect whether the first eNB/cell's ACK/NACK is transmitted or the first eNB/cell and a second eNB/cell's ACK/NACKs are transmitted. In the latter case, the first eNB/cell may derive the UE ID of an associated PDSCH scheduled by a second eNB/cell from the ACK/NACK PUCCH resource index. For UL feedback where a PUCCH/PUSCH transmission is received by a first eNB/cell and a second eNB/cell, a first eNB/cell may forward ACK/NACK results of an associated PDSCH scheduled by a second eNB/cell, UE ID, and TTI index to the second eNB/cell.

For feedback where a single PUCCH transmission is received by a first eNB/cell and not a second eNB/cell, in each sub-frame n if a first eNB/cell did not schedule a PDSCH in sub-frame n−4, a first eNB/cell may perform blind detection on each of the ACK/NACK PUCCH resources reserved for a second eNB/cell. Upon successful detection, a first eNB/cell may obtain the ACK/NACK results and forward the results to a second eNB/cell with an ACK/NACK PUCCH resource index and TTI index. Based on these values, a second eNB/cell may derive the corresponding UE ID or associated PDSCH according to the mapping rule of ACK/NACK PUCCH resource index.

For feedback where a single PUCCH/PUSCH transmission is received by a first eNB/cell and a second eNB/cell, at each sub-frame n if a second eNB/cell schedules a PDSCH at sub-frame n−4, the second eNB/cell may perform decoding and/or detection of ACK/NACK PUCCH first at the PUCCH resources index mapped to corresponding PDSCH assignment PDCCH. If no valid ACK/NACK feedback is detected, the second eNB/cell may perform blind detection on each of the ACK/NACK PUCCH resources reserved for a first eNB/cell with the knowledge that a first eNB/cell and a second eNB/cell's ACK/NACKs may be transmitted jointly.

Hybrid feedback may be disclosed. In an example of a hybrid approach, part of an UL feedback (e.g., CSI) may be sent to a first eNB/cell and another part (e.g., ACK/NACK), which may be more time-sensitive, may be sent to both eNBs/cells, e.g., as depicted in FIG. 3C. The UE may send a separate PUCCH transmission or PUSCH transmission to a first eNB/cell and a second eNB/cell, e.g., as described herein. The information carried on the transmission to a first eNB/cell may be different than that to a second eNB/cell. UL transmission to a second eNB/cell may be divided into two parts: time sensitive information such as ACK/NACK, and time non-sensitive information such as PMI and/or CQI, which may be used to support DL transmission. ACK/NACK in response to the PDSCH from a second eNB/cell may be transmitted to a second eNB/cell. PMI and/or CQI to a second eNB/cell may be combined with information sent to the first eNB/cell, and transmitted together to a first eNB/cell. Since the payload on the PUCCH/PUSCH to a second eNB/cell may be reduced, the required power may be reduced (e.g., it may have a better chance of reaching the second eNB/cell, and may cause less interference to a first eNB/cell). The combined information may be transmitted over the PUCCH or PUSCH. In the former case, a PUCCH format may be created. Information to a first eNB/cell and a second eNB/cell may be jointly encoded or encoded separately.

One or more of the following may be performed by the UE. When the UE is to send ACK/NACK, or ACK/NACK+SR to a first eNB/cell or a second eNB/cell, it may send a PUCCH with format 1a/1b to that cell, or a PUSCH to that cell. When the UE is to send ACK/NACK, or ACK/NACK+SR to both a first eNB/cell and a second eNB/cell, it may send a separate PUCCH with format 1a/1b, or a PUSCH to a first eNB/cell and a second eNB/cell. When the UE is to send ACK/NACK+SR+PMI/CQI/RI to a first eNB/cell, it may send a PUCCH with format 2/2a/2b or PUSCH to a first eNB/cell. When the UE is to send ACK/NACK+SR+PMI/CQI/RI to a second eNB/cell, it may send a PUCCH transmission with format 1/1a/1b, or PUSCH transmission comprising ACK/NACK+SR to a second eNB/cell, and a PUCCH transmission (e.g., with a created format) or a PUSCH transmission to a first eNB/cell that comprises PMI/CQI information to a second eNB/cell. When the UE is to send ACK/NACK+SR+PMI/CQI/RI to a first eNB/cell and a second eNB/cell, it may send a PUCCH transmission with format 1/1a/1b or a PUSCH transmission comprising ACK/NACK+SR to a second eNB/cell. It may send a PUCCH transmission (e.g., with a created format) or a PUSCH transmission to a first eNB/cell that comprises ACK/NACK+SR+PMI/CQI/RI for a first eNB/cell, and PMI/CQI/RI for a second eNB/cell.

One or more of the following may relate to eNB actions (e.g., which may correspond to one or more of the UE actions disclosed above. The target cell may decode its own PUCCH or PUSCH. A second eNB/cell may decode its PUCCH or PUSCH to extract ACK/NACK+SR, and, a first eNB/cell decodes its PUCCH or PUSCH to extract PMI/CQI/RI and forward PMI/CQI/RI to a second eNB/cell. A second eNB/cell may decode its PUCCH or PUSCH to extract ACK/NACK+SR, and, a first eNB/cell may decode its PUCCH or PUSCH to extract its ACK/NACK+SR+PMI/CQI/RI and extract PMI/CQI/RI of a second eNB/cell, where the second eNB/cell may forward the PMI/CQI/RI to a second eNB/cell.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:
1. A method for a user equipment (UE) to provide feedback, the method comprising:
receiving a payload of data, wherein the payload of data comprises a first data from a first network entity via a first MAC instance and a second data from a second network entity via a second MAC instance, the first data being received in accordance with a first downlink assignment from the first network entity, the second data being received in accordance with a second downlink assignment from the second network entity;
sending a first feedback relating to at least the first data in a first subframe to the first network entity via the first MAC instance; and sending a second feedback relating to at least the second data in a second subframe to the second network entity via the second MAC instance, wherein the first subframe associated with the first feedback sent to the first network entity and the second subframe associated with the second feedback sent to the second network entity are staggered in time, and wherein the first feedback and the second feedback are sent on one or more of a physical shared uplink channel (PUSCH) or a physical uplink control channel (PUCCH).

2. The method of claim 1, wherein the first network entity is a primary eNodeB (eNB) and the second network entity is a secondary eNB.

3. The method of claim 1, wherein the first feedback comprises one or more of a HARQ feedback, a scheduling request (SR), or a channel state information (CSI) feedback.

4. The method of claim 1, wherein the first subframe is comprised in a first set of subframes and the second subframe is comprised in a second set of subframes.

5. The method of claim 1, wherein the first feedback and the second feedback are sent on PUCCH, when simultaneous use of PUCCH and PUSCH is configured.

6. The method of claim 1, wherein the first feedback and the second feedback are sent on the PUCCH, if a PUSCH transmission is not scheduled.

7. The method of claim 1, further comprising monitoring a grant relating to PUSCH transmissions from the first network entity limited to a period during which reception results in sending the first feedback relating to the first data in the first subframe.

8. A user equipment (UE) configured to provide feedback, the UE comprising:
a receiver configured to:
receive payload of data, wherein the payload of data comprises a first data from a first network entity via a first MAC instance and a second data from a second network entity via a second MAC instance, the first data being received in accordance with a first downlink assignment from the first network entity, the second data being received in accordance with a second downlink assignment from the second network entity; and
a transmitter configured to:
send a first feedback relating to at least the first data in a first subframe to the first network entity via the first MAC instance, and
send a second feedback relating to at least the second data in a second subframe to the second network entity via the second MAC instance, wherein the first subframe associated with the first feedback sent to the first network entity and the second subframe associated with the second feedback sent to the second network entity are staggered in time, and wherein the first feedback and the second feedback are sent on one or more of a physical shared uplink channel (PUSCH) or a physical uplink control channel (PUCCH).

9. The UE of claim 8, wherein the first network entity is a primary eNodeB (eNB) and the second network entity is a secondary eNB.

10. The UE of claim 8, wherein the first feedback comprises one or more of a HARQ feedback, a scheduling request (SR), or a channel state information (CSI) feedback.

11. The UE of claim 8, wherein the first subframe is comprised in a first set of subframes and the second subframe is comprised in a second set of subframes.

12. The UE of claim 8, wherein the first feedback and the second feedback are sent on PUCCH, when simultaneous use of PUCCH and PUSCH is configured.

13. The UE of claim 8, wherein the first feedback and the second feedback are sent on the PUCCH, if a PUSCH transmission is not scheduled.

14. The UE of claim 8, further comprising a processor configured to monitor a grant relating to PUSCH transmissions from the first network entity limited to a period during which reception results in sending the first feedback relating to the first data in the first subframe.

15. The method of claim 1, wherein a format and a resource index of a PUCCH transmission carrying feedback for a PDSCH transmission in the first subframe or the second subframe may be determined from one or more of a property of the PDSCH transmission or its corresponding PDCCH assignment.

16. The UE of claim 9, wherein a format and a resource index of a PUCCH transmission carrying feedback for a PDSCH transmission in the first subframe or the second subframe may be determined from one or more of a property of the PDSCH transmission or its corresponding PDCCH assignment.

17. A user equipment (UE) comprising:
a receiver configured to:
receive payload of data, wherein the payload of data comprises a first data from a first network entity via a first MAC instance and a second data from a second network entity via a second MAC instance, the first data being received in accordance with a first downlink assignment from the first network entity, the second data being received in accordance with a second downlink assignment from the second network entity; and
a transmitter configured to:
send a first feedback relating to at least the first data and the second data in a first subframe to the first network entity via the first MAC instance, and
send a second feedback relating to at least the first data and the second data in a second subframe to the second network entity via the second MAC instance, wherein the first subframe associated with the first feedback sent to the first network entity and the second subframe associated with the second feedback sent to the second network entity are staggered in time, and wherein the first feedback and the second feedback are sent on one or more of a physical shared uplink channel (PUSCH) or a physical uplink control channel (PUCCH).

18. The UE of claim 17, wherein the first data and the second data are received substantially simultaneously.

19. The method of claim 1, wherein each of the first downlink assignment and the second downlink assignment are each a PDSCH assignments.

20. The UE of claim 1, wherein each of the first downlink assignment and the second downlink assignment are each a PDSCH assignments.

* * * * *